(12) United States Patent
Karaiwa

(10) Patent No.: US 6,706,385 B1
(45) Date of Patent: Mar. 16, 2004

(54) HIGH LUBRICITY, MULTI-LAYER POLYOLEFIN LAMINATE

(75) Inventor: Masato Karaiwa, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/599,874

(22) Filed: Jun. 23, 2000

(30) Foreign Application Priority Data

Jun. 24, 1999 (JP) .............................. 11/178231

(51) Int. Cl.⁷ .............. B32B 5/02; B32B 5/16; B32B 25/12; B32B 27/00; B32B 27/32
(52) U.S. Cl. ............ 428/323; 428/327; 428/500; 428/515; 428/908.8
(58) Field of Search ................... 428/323, 500, 428/515, 327, 908.8; 525/189

(56) References Cited

U.S. PATENT DOCUMENTS

| | | | |
|---|---|---|---|
| 5,424,135 A | * 6/1995 | Murata et al. | 428/517 |
| 5,441,685 A | * 8/1995 | Miyakawa et al. | 264/148 |
| 5,447,671 A |   9/1995 | Kato et al. | |

FOREIGN PATENT DOCUMENTS

| | | | |
|---|---|---|---|
| EP | 0 860 314 A1 | 8/1998 | |
| EP | 0860314 | * 8/1998 | |
| JP | 03041137 A | * 2/1991 | |
| JP | 9176408 | 7/1997 | |
| JP | 09176408 A | * 7/1997 | |

* cited by examiner

*Primary Examiner*—Paul Thibodeau
*Assistant Examiner*—Nikolas J Uhlir
(74) *Attorney, Agent, or Firm*—Birch, Stewart, Kolasch & Birch, LLP

(57) ABSTRACT

The laminate of the invention comprises a sliding member of a resin composition and a Substrate layer of a thermoplastic olefin elastomer (A), and is obtained by co-extruding: the resin composition which is obtained by melt kneading a thermoplastic olefin elastomer (A), an ultra-high-molecular weight polyolefin (except a powder thereof having a particle diameter of 1 to 100 $\mu$m) having an intrinsic viscosity, as measured in a decalin solvent at 135° C., of 1 to 40 dl/g, an inorganic or organic filler powder, and optionally, a polyolefin resin, an organopolysiloxane, a fatty acid amide and a fluororubber in a twin-screw extruder, and the thermoplastic olefin elastomer (A). The laminate has excellent sliding properties with window glass and excellent abrasion resistance. Moreover, the laminate can be produced by a simple process because it requires no adhesive, and the laminate has great bonding strength between the substrate layer and the sliding member layer.

11 Claims, 1 Drawing Sheet

HIGH LUBRICITY, MULTI-LAYER POLYOLEFIN LAMINATE

FIELD OF THE INVENTION

The present invention relates to a laminate comprising a sliding member layer and a substrate layer, and more particularly to a laminate which has excellent sliding properties with window glass and abrasion resistance and is favorably used for a glass run channel and the like.

BACKGROUND OF THE INVENTION

Thermoplastic olefin elastomers are lightweight, can be easily recycled and generate no harmful gas when incinerated, so that they are increasingly used for automobile parts, industrial mechanical parts, electric/electronic parts, building materials, etc. from the viewpoints conservation of energy, conservation of resources, and particularly in recent years, protection of global environment.

One example of the automobile parts is a glass run channel. The glass run channel is a guide member provided between window glass and window frame, and the glass run channel needs to facilitate a rise/fall (open/shut) operation of the window glass and to close the window glass tight (fluid-tight) on the window frame.

In the conventional glass run channel, a nylon film or the like to slide the window glass thereon is laminated onto a surface of a substrate made of, for example, a non-rigid synthetic resin (e.g., a non-rigid vinyl chloride resin) or an ethylene/propylene/diene copolymer rubber by using an adhesive. In order to decrease the contact area with the window glass, the nylon film is subjected to embossing before or after laminating.

The process for producing the glass run channel includes a laminating step using an adhesive, and hence the resulting glass run channel has a drawback that the skin layer is liable to peel off from the substrate. Moreover, the process is complicated because of a large number of steps.

Under such circumstances, the present inventors paid attention to the aforesaid thermoplastic olefin elastomers in order to solve such problems on the glass run channel as described above. However, when a thermoplastic olefin elastomer is used for a glass run channel as a single layer, the resulting glass run channel exhibits bad sliding properties with the window glass and is violently abraded.

Toward this problem, it is known that the sliding properties and the abrasion resistance are improved by adding a fatty acid amide to a thermoplastic olefin elastomer composition, as described in Japanese Patent Laid-Open Publication No. 176408/1997. Even by this method, however, improvement in the sliding properties and the abrasion resistance is not still satisfactory, and hence it is necessary to improve the sliding properties by adding silica or the like to roughen the surface of the skin layer. By the addition of silica or the like, however, the skin layer is hardened, and the manufactured product may have a crease when it is bent.

OBJECT OF THE INVENTION

The present invention is intended to solve such problems associated with the prior art as described above, and it is an object of the invention to provide a laminate which has excellent sliding properties with window glass and excellent abrasion resistance and is favorably used for a glass run channel and the like.

SUMMARY OF THE INVENTION

The laminate according to the invention comprises a sliding member layer composed of a resin composition and a substrate layer composed of a thermoplastic olefin elastomer (A), and is obtained by co-extruding:

said resin composition which is obtained by melt kneading 100 parts by weight of a thermoplastic olefin elastomer (A), 10 to 250 parts by weight of an ultra-high-molecular weight polyolefin (B) (except a powder thereof having a particle diameter of 1 to 100 $\mu$m) having an intrinsic viscosity ($\eta$), as measured in a decalin solvent at 135° C., of 1 to 40 dl/g, and 1 to 300 parts by weight of an inorganic or organic filler powder (C) having a particle diameter of 1 to 100 $\mu$m in a twin-screw extruder, and said thermoplastic olefin elastomer (A).

In the sliding member layer, the inorganic or organic filler powder (C) is homogeneously dispersed.

To the resin composition, a polyolefin resin (D) may be added in an amount of 1 to 150 parts by weight, and an organopolysiloxane (E) may be added in an amount of 1 to 50 parts by weight, each amount being based on 100 parts by weight of the thermoplastic olefin elastomer (A). Further, a fatty acid amide (F) may be added in an amount of 1 to 50 parts by weight, and a fluororubber (G) may be added in an amount of 1 to 20 parts by weight, each amount being based on 100 parts by weight of the thermoplastic olefin elastomer (A).

The inorganic or organic filler powder (C) is preferably an ultra-high-molecular weight polyolefin powder having an intrinsic viscosity ($\eta$), as measured in a decalin solvent at 135° C., of 1 to 40 dl/g.

Figure 1:
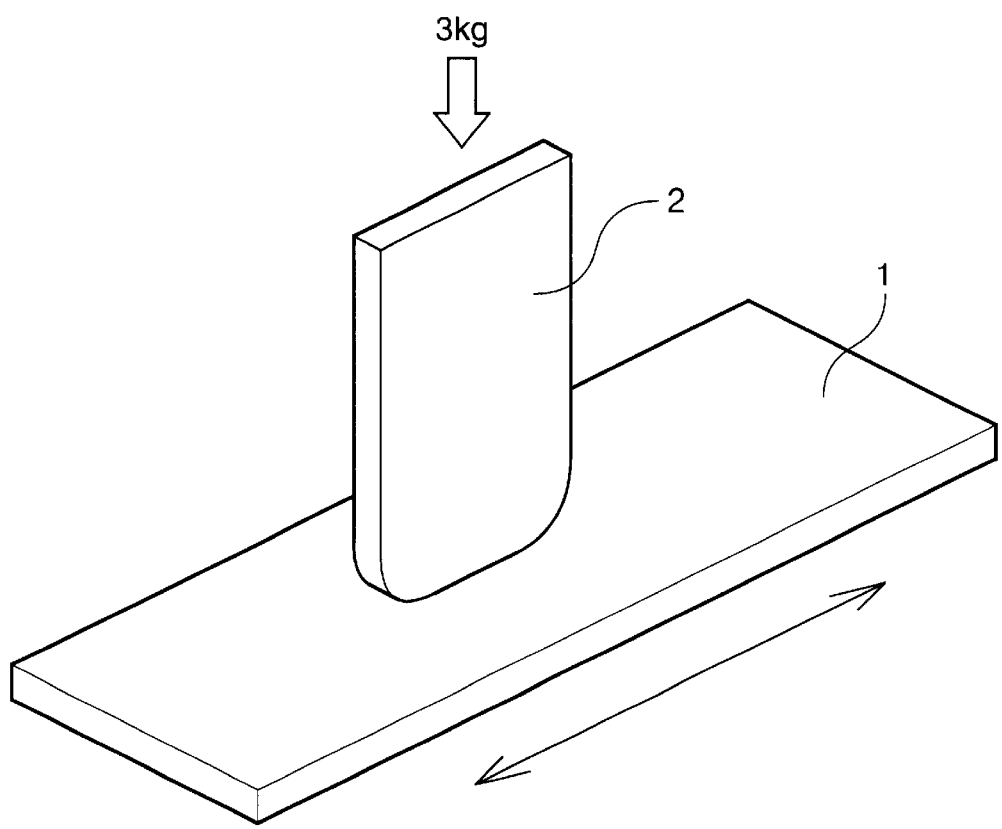
FIG. 1 is a schematic perspective view to explain a method of measuring slide abrasion of an injection molded specimen prepared from a resin composition obtained in each of the examples of the invention and the comparative examples.

1: specimen
2: abrading glass

DETAILED DESCRIPTION OF THE INVENTION

The laminate according to the invention is described in detail hereinafter.

The laminate of the invention comprises a sliding member layer and a substrate layer.

The resin composition for forming the sliding member layer of the laminate of the invention comprises a thermoplastic olefin elastomer (A), an ultra-high-molecular weight polyolefin (B) and an inorganic or organic filler powder (C). Further, a polyolefin resin (D), an organopolysiloxane (E), a fatty acid amide (F) and a fluororubber (G) may be contained in the resin composition, when needed.

Thermoplastic Olefin Elastomer (A)

The thermoplastic olefin elastomer (A) for use in the invention comprises a crystalline polyolefin and a rubber.

The crystalline polyolefin for use in the invention is a homopolymer or a copolymer of an $\alpha$-olefin of 2 to 20 carbon atoms.

Examples of the crystalline polyolefins include the following (co)polymers:

(1) an ethylene homopolymer (may be produced by any of low-pressure and high-pressure processes), (2) a copolymer of ethylene and not more than 10% by mol of another α-olefin or a vinyl monomer such as vinyl acetate or ethyl acrylate, (3) a propylene homopolymer, (4) a random copolymer of propylene and not more than 10% by mol of another α-olefin, (5) a block copolymer of propylene and not more than 30% by mol of another α-olefin, (6) a 1-butene homopolymer, (7) a random copolymer of 1-butene and not more than 10% by mol of another α-olefin, (8) a 4-methyl-1-pentene homopolymer, and (9) a random copolymer of 4-methyl-1-pentene and not more than 20% by mol of another α-olefin.

Examples of the α-olefins include ethylene, propylene, 1-butene, 4-methyl-1-pentene, 1-hexene and 1-octene.

There is no specific limitation on the rubber for use in the invention, but an olefin copolymer rubber is preferable.

The olefin copolymer rubber is an amorphous, random, elastomeric copolymer rubber containing an α-olefin of 2 to 20 carbon,atoms as its main component, and examples thereof include an amorphous α-olefin copolymer comprising two or more kinds of α-olefins and an α-olefin/non-conjugated diene copolymer comprising two or more kinds of α-olefins and a non-conjugated diene.

Specific examples of the olefin copolymer rubbers include the following rubbers:

(1) an ethylene/α-olefin copolymer rubber (ethylene/α-olefin (molar ratio)=about 90/10 to 50/50), (2) an ethylene/α-olefin/non-conjugated diene copolymer rubber (ethylene/α-olefin (molar ratio)=about 90/10 to 50/50), (3) a propylene/α-olefin copolymer rubber (propylene/α-olefin (molar ratio)=about 90/10 to 50/50), and (4) a butene/α-olefin copolymer rubber (butene/α-olefin (molar ratio)=about 90/10 to 50/50).

Examples of the α-olefins are the same as those for constituting the crystalline polyolefin.

Examples of the non-conjugated dienes include dicyclopentadiene, 1,4-hexadiene, cyclooctadiene, methylene norbornene and ethylidene norbornene.

The copolymer rubber has a Mooney viscosity $ML_{1+4}$ (100° C.) of preferably 10 to 250, particularly preferably 40 to 150. When the non-conjugated diene is copolymerized, the copolymer rubber has an iodine value of preferably not more than 25.

In the thermoplastic elastomer, the olefin copolymer rubber can be present in the uncrosslinked state or the crosslinked state such as partially or completely crosslinked state, but in the invention, the olefin copolymer rubber is preferably present in the crosslinked state, particularly in the partially crosslinked state.

As a crosslinking agent to crosslink the olefin copolymer rubber, an organic peroxide, a phenol type vulcanizing agent or the like is employed. Rubbers (A-3) other than the above olefin copolymer rubber (A-2) are also employable in the invention. For example, diene rubbers, such as styrene-butadiene rubber (SBR), nitrile rubber (NBR), natural rubber (NR) and butyl rubber (IIR), SEBS and polyisobutylene are employable.

In the thermoplastic elastomer (A) for use in the invention, the weight ratio (crystalline polyolefin/rubber) of the crystalline polyolefin to the rubber is in the range of usually 90/10 to 5/95, preferably 70/30 to 10/90.

When the olefin copolymer rubber and another rubber are used in combination, another rubber (A-3) is used in an amount of not more than 40 parts by weight, preferably 5 to 20 parts by weight, based on 100 parts by weight of the total of the crystalline polyolefin and the olefin copolymer rubber (A-2).

The thermoplastic elastomer (A) preferably used in the invention comprises a crystalline polypropylene and an ethylene/α-olefin copolymer rubber or an ethylene/α-olefin/non-conjugated diene copolymer rubber. In this thermoplastic elastomer, the rubber component is present in the partially crosslinked state, and the weight ratio (crystalline polypropylene/rubber) of the crystalline polypropylene to the rubber is in the range of 70/30 to 10/90.

To the thermoplastic elastomer (A), additives, such as mineral oil type softener, heat stabilizer, antistatic agent, weathering stabilizer, anti-aging agent, colorant and lubricant, can be optionally added within limits not detrimental to the object of the invention.

The thermoplastic elastomer (A) preferably used in the invention is, for example, a thermoplastic elastomer which is obtained by dynamically heat treating a mixture of:

70 to 10 parts by weight of a crystalline polypropylene (A-1), 30 to 90 parts by weight of a rubber (A-2) comprising an ethylene propylene copolymer rubber or an ethylene/propylene/diene copolymer rubber, the total of said components (A-1) and (A-2) being 100 parts by weight, and 5 to 100 parts by weight of a rubber (A-3) other than the rubber (A-2) and/or a mineral oil type softener (A-4), in the presence of an organic peroxide to crosslink the rubber (A-2).

Examples of the organic peroxides include dicumyl peroxide, di-tert-butyl peroxide, 2,5-dimethyl-2,5-di(tert-butylperoxy)hexane, 2, 5-dimethyl-2,5-di(tert-butylperoxy)hexyne-3, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butyl peroxybenzoate, tert-butyl perbenzoate, tert-butylperoxyisopropyl carbonate, diacetyl peroxide, lauroyl peroxide and tert-butylcumyl peroxide.

Of these, preferable are 2,5-dimethyl-2,5-di(tert-butylperoxy)hexane, 2,5-dimethyl-2,5-di(tert-butylperoxy)hexyne-3, 1,3-bis(tert-butylperoxyisopropyl)benzene, 1,1-bis(tert-butylperoxy)-3,3,5-trimethylcyclohexane and n-butyl-4,4-bis(tert-butylperoxy)valerate from the viewpoints of odor and scorch stability, and of these, most preferable is 1,3-bis(tert-butylperoxyisopropyl)benzene.

In the present invention, the organic peroxide is used in an amount of 0.05 to 3% by weight, preferably 0.1 to 1% by weight, based on 100% by weight of the total of the crystalline polyolefin and the rubber.

In the partial crosslinking by the organic peroxide, a peroxy crosslinking assistant, such as sulfur, p-quinone dioxime, p,p'-dibenzoylquinone dioxime, N-methyl-N-4-dinitrosoaniline, nitrosobenzene, diphenylguanidine or trimethylolpropane-N,N'-m-phenylenedimaleimide, a polyfunctional methacrylate monomer, such as divinylbenzene, triallyl cyanurate, ethylene glycol dimethacrylate, diethylene glycol dimethacrylate, polyethylene glycol dimethacrylate, trimethylolpropane trimethacrylate or allyl methacrylate, or a polyfunctional vinyl monomer, such as vinyl butyrate or vinyl stearate, may be added.

By the use of the above compounds, homogeneous and mild crosslinking reaction can be expected. Particularly, divinylbenzene is most preferably used in the invention. Divinylbenzene can be easily handled, exhibits good compatibility with the crystalline polyolefin and the rubber which are main components of a substance to be crosslinked, and has an action of solubilizing the organic peroxide to serve as a dispersant for the organic peroxide. Hence, a homogeneous crosslinking effect is obtained by the heat treatment and a thermoplastic elastomer well-balanced between flowability and mechanical properties can be obtained.

The crosslinking assistant or the polyfunctional vinyl monomer is used in an amount of preferably 0.1 to 2% by weight, particularly preferably 0.3 to 1% by weight, based on the whole substance to be crosslinked. If the amount of the crosslinking assistant or the polyfunctional vinyl monomer exceeds 2% by weight and if the amount of the organic peroxide is large, the crosslinking reaction proceeds too rapidly and the resulting thermoplastic elastomer has poor flowability.

On the other hand, if the amount of the crosslinking assistant or the polyfunctional vinyl monomer exceeds 2% by weight and if the amount of the organic peroxide is small, the crosslinking assistant or the polyfunctional vinyl monomer remains as an unreacted monomer in the thermoplastic elastomer, and hence change in the mechanical properties of the thermoplastic elastomer due to the heat history in the molding process may occur. Therefore, the crosslinking assistant and the polyvinyl monomer should not be added in excess.

The expression "dynamically heat treating" means to knead the above components in a molten state.

As the kneading device, a conventional kneading device, such as an open mixing roll, a closed Banbury mixer, an extruder, a kneader or a continuous mixer, is employed. Of these, a closed kneading device is preferable. The kneading is preferably carried out in an atmosphere of an inert gas such as a nitrogen gas or a carbonic acid gas.

Further, the kneading is preferably carried out at a temperature at which the half-life period of the organic peroxide used becomes less than one minute. The kneading temperature is in the range of usually 150 to 280° C., preferably 170 to 240° C., and the kneading time is in the range of usually 1 to 20 minutes, preferably 3 to 10 minutes. The shear force applied is determined to be not less than 100 sect$^{-1}$, preferably 500 to 10,000 sec $^{-1}$, in terms of shear rate.

The thermoplastic elastomer (A) particularly preferably used in the invention is a partially crosslinked one, and by the term "partially crosslinked" is meant that the gel content as measured by the following method is in the range of 20 to 98%. In the present invention, the gel content is preferably in the range of 40 to 98% by weight.

Gel Content Measuring Method

About 100 mg of a thermoplastic elastomer sample is weighed out and cut into small pieces of 0.5 mm×0.5 mm×0.5 mm. The resulting small pieces are immersed in 30 ml of cyclohexane at 23° C. for 48 hours in a closed container.

Then, the sample is taken out, placed on a filter and dried at room temperature for 72 hours or more until a constant weight is obtained.

From the weight of the dry residue, the weight of the cyclohexane-insoluble components (e.g., fibrous filler, filler, pigment) other than the polymer component is subtracted, and the obtained value is taken as "corrected final weight (Y)".

Separately, from the weight of the sample, the weight of the cyclohexane-soluble components (e.g., softener) other than the polymer component and the weight of the cyclohexane-insoluble components (e.g., fibrous filler, filler, pigment) other than the polymer component are subtracted, and the obtained value is taken as "corrected initial weight (X)".

The gel content (weight of cyclohexane-insoluble components) is calculated from the following formula:

Gel content (wt %)=(Corrected final weight (Y))÷(Corrected initial weight (X))×100

The thermoplastic elastomer (A) for use in the invention comprises the crystalline polyolefin and the rubber and thereby has excellent flowability.

The thermoplastic elastomer (A) can be molded by a conventional molding device used in compression molding, transfer molding, injection molding, extrusion molding or the like.

Ultra-high-molecular Weight Polyolefin (B)

The ultra-high-molecular weight polyolefin (B) for use in the invention is preferably fed in the form of pellets excluding powder having a particle diameter of 1 to 100 μm, and the diameter of the pellets is in the range of usually 1 to 10 mm, preferably 2 to 6 mm, more preferably 3 to 5 mm. The intrinsic viscosity (η) of the polyolefin (B), as measured in a decalin solvent at 135° C., is in the range of 1 to 40 dl/g, preferably not less than 1 dl/g and less than 10 dl/g.

The ultra-high-molecular weight polyolefin (B) comprises a homopolymer or a copolymer of an α-olefin such as ethylene, propylene, 1-butene, 1-pentene, 1-hexene, 1-octene, 1-decene, 1-dodecene, 4-methyl-1-pentene or 3-methyl-1-pentene. In the present invention, an ethylene homopolymer or a copolymer comprising ethylene as a main component and another α-olefin is preferable.

The ultra-high-molecular weight polyolefin (B) is used in an amount of 10 to 250 parts by weight based on 100 parts by weight of the olefin thermoplastic elastomer (A).

Inorganic or Organic Filler Powder (C)

The inorganic or organic filler powder (C) for use in the invention has a particle diameter of 1 to 100 μm, preferably 1 to 50 μm, more preferably 10 to 40 μm, particularly preferably 20 to 30 μm.

Examples of the inorganic filler powders include powers of talc, silica and graphite.

The organic filler powder preferably used is, for example, a powder of an ultra-high-molecular weight polyolefin having an intrinsic viscosity (η), as measured in a decalin solvent at 135° C., of 1 to 40 dl/g, preferably 5 to 30 dl/g, more preferably 10 to 20 dl/g.

The ultra-high-molecular weight polyolefin comprises a homopolymer or a copolymer of an α-olefin such as ethylene, propylene, 1-butene, 1-pentene, 1-hexene, 1-octene, 1-decene, 1-dodecene, 4-methyl-1-pentene or 3-methyl-1-pentene. In particular, an ethylene homopolymer or a copolymer comprising ethylene as a main component and another α-olefin is preferable.

The inorganic or organic filler powder (C) is used in an amount of 1 to 300 parts by weight, preferably 10 to 200 parts by weight, based on 100 parts by weight of the thermoplastic olefin elastomer (A).

Polyolefin Resin (D)

The polyolefin resin (D) optionally used in the invention is preferably the crystalline polyolefin as used in the aforesaid thermoplastic olefin elastomer (A).

The polyolefin resin (D) is used in an amount of 1 to 150 parts by weight, preferably 5 to 150 parts by weight, particularly preferably 5 to 100 parts by weight, based on 100 parts by weight of the thermoplastic olefin elastomer (A).

Organopolysiloxane (E)

Examples of the organopolysiloxanes (E) optionally used in the invention include dimethyl polysiloxane, methylphenyl polysiloxane, fluoropolysiloxane, tetramethyltetraphenyl polysiloxane, methyl hydrogenpolysiloxane, and modified polysiloxanes such as epoxy modified, alkyl modified, amino modified, carboxyl group modified, alcohol modified, fluorine modified, alkylaralkyl polyether modified or epoxy polyether modified polysiloxanes. Of these, dimethyl polysiloxane is preferably employed.

As the dimethyl polysiloxane, a combination of dimethyl polysiloxane having a viscosity (JIS K 2283, 25° C.) of not less than 1,000,000 cSt, preferably 1,000,000 to 50,000,000 cSt, particularly preferably 10,000,000 to 20,000,000 cSt, and dimethyl polysiloxane having a viscosity (JIS K 2283, 25° C.) of not more than 1,000,000 cSt, preferably 1,000 to 50,000, is desirably employed.

Since the dimethyl polysiloxane of not less than 1,000,000 cSt is extremely viscous, a masterbatch may be formed from this dimethyl polysiloxane and the polyolefin resin (D) in order to enhance dispersibility of the dimethyl polysiloxane in the thermoplastic olefin elastomer (A).

The organopolysiloxane (E) is used in an amount of 1 to 50 parts by weight, preferably 10 to 50 parts by weight, based on 100 parts by weight of the thermoplastic olefin elastomer (A).

Fatty Acid Amide (F)

Examples of the fatty acid amides (F) optionally used in the invention include:

saturated fatty acid amides, such as laurylamide, palmitamide, stearamide and behenic acid amide;

unsaturated fatty acid amides, such as erucamide, oleamide, brassidamide and elaidamide;

bis fatty acid amides, such as methylenebisstearamide, methylenebisoleamide, ethylenebisstearamide and ethylenebisoleamide.

Of these, preferable are erucamide, oleamide and ethyelnebisoleamide.

The fatty acid amide (F) is used in an amount of 1 to 50 parts by weight, preferably 5 to 10 parts by weight, based on 100 parts by weight of the thermoplastic olefin elastomer (A).

Fluororubber (G)

Examples of the fluororubbers (G) optionally used in the invention include conventional fluororubbers, such as a vinylidene fluoride rubber, a fluorosilicone rubber, a tetrafluoroethylene/propylene rubber, a fluorophosphazene rubber and a tetrafluoroethylene/perfluorovinyl ether rubber. Of these, a vinylidene fluoride rubber is preferably used.

The fluororubber (G) is used in an amount of 1 to 20 parts by weight, preferably 1 to 10 parts by weight, more preferably 1 to 7 parts by weight, based on 100 parts by weight of the thermoplastic olefin elastomer (A).

Other Components

To the resin composition for forming the sliding member layer of the laminate of the invention, additives, such as mineral oil type softener, heat stabilizer, antistatic agent, weathering stabilizer, anti-aging agent, colorant and lubricant, can be optionally added within limits not detrimental to the object of the invention.

Laminate

The laminate according to the invention comprises a sliding member layer made of the above-described resin composition and a substrate layer made of a thermoplastic olefin elastomer (A).

The thermoplastic olefin elastomer (A) for forming the substrate layer is the same as the olefin thermoplastic elastomer (A) used in the aforesaid resin composition. The properties of the thermoplastic olefin elastomer (A) for forming the substrate layer may be the same as or different from those of the thermoplastic olefin elastomer (A) used as one component of the resin composition.

To the thermoplastic olefin elastomer for forming the substrate layer, additives, such as mineral oil type softener, heat stabilizer, antistatic agent, weathering stabilizer, anti-aging agent, colorant and lubricant, can be optionally added within limits not detrimental to the object of the invention.

When the sliding member layer of the laminate of the invention is observed by an electron microscope, the inorganic or organic filler powder (C) is found to be homogeneously dispersed. Thus, the inorganic or organic filler powder (C) is homogeneously dispersed in the sliding member layer, so that the laminate of the invention has excellent sliding properties with window glass.

The laminate of the invention can be produced by co-extruding:

the resin composition, which is obtained by melt kneading the thermoplastic olefin elastomer (A), the ultra-high-molecular weight polyolefin (B), the inorganic or organic filler powder (C), and optionally, the polyolefin resin (D), the organopolysiloxane (E), the fatty acid amide (F) and the fluororubber (G), in specific proportions by the use of a twin-screw extruder, and the thermoplastic olefin elastomer (A).

The resin composition obtained by melt kneading may be a molten resin composition, or may be a resin composition in the form of pellets.

According to the laminating method using heat fusion bonding, no adhesive is necessary, a laminate can be obtained through a simple process, and the bonding strength between the substrate layer and the sliding member layer is great.

The laminate obtained as above is favorable for automobile parts, such as a glass run channel, a window mole and a side mole.

EFFECT OF THE INVENTION

The resin composition used for forming the sliding member layer of the laminate of the invention has excellent extrusion moldability.

The laminate of the invention is excellent in sliding properties with window glass and abrasion resistance because the inorganic or organic filler powder (C) is homogeneously dispersed in its sliding member layer.

Moreover, the laminate of the invention can be produced by a simple process because it requires no adhesive, and the laminate has great bonding strength between the substrate layer and the sliding member layer.

EXAMPLE

The present invention is further described with reference to the following examples, but it should be construed that the invention is in no way limited to those examples.

Examples 1–6, Comparative Examples 1–4

Preparation of Thermoplastic Olefin Elastomer

60 Parts by weight of an ethylene/propylene/5-ethylidene-2-norbornene copolymer rubber (ethylene content: 70% by mol, iodine value: 12, Mooney viscosity $ML_{1+4}(100°$ C.): 120) and 40 parts by weight of polypropylene (MFR (ASTM D 1238-65T, 230° C.): 13 g/10 min, density: 0.91 g/cm$^3$) were kneaded by a Banbury mixer at 180° C. for 5 minutes in an atmosphere of nitrogen, and the kneadate was passed through rolls to prepare a sheet. The sheet was cut by a sheet cutter to give square pellets.

Then, the square pellets, 0.2 part by weight of 1,3-bis(tert-butylperoxyisopropyl)benzene and 0.2 part by weight of divinylbenzene were mixed and stirred by a Henschel mixer.

The resulting mixture was extruded by a twin-screw extruder (L/D: 40, screw diameter: 50 mm) at 220° C. in an atmosphere of nitrogen to obtain a thermoplastic olefin elastomer (referred to as "TPO").

The gel content in the thermoplastic olefin elastomer (TPO) obtained was determined by the aforesaid method. As a result, the gel content was 78% by weight.

Preparation of Pellets of Resin Composition

The thermoplastic olefin elastomer (TPO) and the following materials were melt kneaded in proportions shown in Table 1 by means of a twin-screw extruder to obtain pellets of a resin composition.

Materials

Ultra-High-Molecular Weight Polyolefin (B)

Ultra-high-molecular weight polyethylene pellets (referred to as "ultra-high-molecular weight PE pellets") having an intrinsic viscosity (η), as measured in a decalin solvent at 135° C., of 2 dl/g and a diameter of 3 to 5 mm.

Inorganic or Organic Filler Powder (C)

Ultra-high-molecular weight polyethylene powder (referred to as "ultra-high-molecular weight PE powder") having an intrinsic viscosity (η), as measured in a decalin solvent at 135° C., of 28 dl/g and a particle diameter of 20 to 30 μm Polyolefin Resin (D)

Polypropylene resin (referred to as "PP") having MFR (ASTM D 1238-65T, 230° C.) of 3 g/10 min and a density (ASTM D 1505) of 0.91 g/cm$^3$ Organopolysiloxane (E)

(1) Silicone oil-polypropylene masterbatch BY27-001 (referred to as "high-viscosity silicone"), available from Toray Dow Corning Co., content of ultra-high-molecular weight silicone oil: 50% by weight (2) Silicone oil SH200 (3000 cSt) (referred to as "low-viscosity silicone oil"), available from Toray Dow Corning Co.

Fatty Acid Amide (F)

Erucamide (trade name: Alflow), available from Nippon Oils & Fats Co., Ltd.

Fluororubber (G)

Fluororubber (trade name: Dynamer FX9613), available from Sumitomo 3M K.K.

The pellets of the resin composition were subjected to injection molding to obtain a square plate of 150 mm×120 mm×3 mm. Using the square plate, measurement of a coefficient of friction and evaluation of slide abrasion properties were carried out. The evaluation method is described below, and the results are set forth in Table 1.

(1) Coefficient of Friction

The coefficient of friction with glass was measured under a load of 200 g in accordance with ASTM D1894-75.

(2) Slide Abrasion Properties

In a slide abrasion tester shown in FIG. 1, a slide test (10,000 cycles, stroke: 100 mm) was carried out under a load of 3 kg using abrading glass 2, to measure abrasion depth (μm) of a specimen 1.

Preparation of Laminate

The pellets of the resin composition obtained above and a thermoplastic elastomer (TPO) identical with the thermoplastic elastomer (A) used for preparing the resin composition were co-extruded using a single-screw extruder having a full flighted screw (screw diameter: 30 mm, L/D: 28, compression ratio: 4.0) for the resin composition and using a single-screw extruder having a full flighted screw (screw diameter: 50 mm, L/D: 28, compression ratio: 4.0) for the thermoplastic elastomer.

The preset temperatures (zones (C1–C4), head (H) and die (D)) for the extrusion molding of the resin composition are as follows.

C1/C2/C3/C4/H/D=160/170/180/190/200/210 (°C.)

The preset temperatures (zones (C1C4), head (H) and die (D)) for the extrusion molding of the thermoplastic elastomer are as follows.

C1/C2/C3/C4/H/D=160/170/180/200/220/220 (°C.)

The two-layer laminate thus extruded was bent in the direction of 180° and then returned to the initial state to observe a crease on the surface of the sliding member layer. The crease was evaluated based on the following criteria.

AA: No crease is observed.

BB: An inconspicuous crease is observed.

CC: A crease is observed.

The extrusion moldability of the resin composition in the co-extrusion was evaluated based on the following criteria.

AA: The resin composition can be extruded in a uniform thickness.

BB: The thickness of the resin composition extruded is a little changed.

CC: The resin composition cannot be extruded in a uniform thickness.

The results are set forth in Table 1.

Electron photomicrographs of the sections of the sliding member layers of the laminates obtained in Examples 1 to 6 were examined. As a result, the ultra-high-molecular weight polyethylene powder was found to be homogeneously dispersed.

TABLE 1

| | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 |
|---|---|---|---|---|---|---|---|---|---|---|
| Composition (parts by weight) | | | | | | | | | | |
| TPO | 100.0 | 100.0 | 100.0 | 100.0 | 100.0 | 100.0 | 100.0 | 100.0 | 100.0 | 100.0 |
| Ultra-high molecular weight PE pellets | 25.0 | 50.0 | 50.0 | 30.0 | 166.7 | 33.3 | 0.0 | 21.4 | 300.0 | 100.0 |
| Ultra-high molecular weight PE powder | 16.7 | 33.3 | 33.3 | 60.0 | 33.3 | 166.7 | 0.0 | 0.0 | 50.0 | 600.0 |
| PP | 20.8 | 141.7 | 141.7 | 5.0 | 25.0 | 25.0 | 39.3 | 17.9 | 37.5 | 175.0 |
| High-viscosity silicone | 4.2 | 8.3 | 8.3 | 5.0 | 8.3 | 8.3 | 3.6 | 3.6 | 12.5 | 25.0 |
| Low-viscosity silicone oil | 3.3 | 6.7 | 6.7 | 4.0 | 6.7 | 6.7 | 2.9 | 2.9 | 10.0 | 20.0 |
| Fatty acid amide | 3.3 | 6.7 | 6.7 | 4.0 | 6.7 | 6.7 | 2.9 | 2.9 | 10.0 | 20.0 |
| Fluororubber | 0.0 | 0.0 | 5.0 | 0.0 | 0.0 | 0.0 | 0.0 | 0.0 | 0.0 | 0.0 |
| Extrusion moldability | AA | AA | AA | AA | AA | AA | AA | AA | AA | AA |
| Elongation at break (%) | 350 | 250 | 350 | 300 | 70 | 70 | 400 | 350 | 35 | 35 |
| Coefficient of friction | 0.15 | 0.1 | 0.1 | 0.1 | 0.1 | 0.1 | 0.3 | 0.25 | 0.1 | 0.1 |
| Depth of slide abrasion (μm) | 60 | 60 | 50 | 30 | 20 | 20 | 80 | 60 | 20 | 20 |
| Crease | AA | AA | AA | AA | AA | AA | AA | AA | CC | CC |

What is claimed is:

1. A laminate comprising a sliding member layer composed of a resin composition and a substrate layer composed of a thermoplastic olefin elastomer (A), said laminate being obtained by co-extruding:
said resin composition which is obtained by melt kneading 100 parts by weight of a thermoplastic olefin elastomer (A), 10 to 250 parts by weight of an ultra-high-molecular weight polyolefin (B) in the form of pellets having a particle diameter of 1 to 10 mm having an intrinsic viscosity (η), as measured in a decalin solvent at 135° C., of not less than 1 dl/g and less than 10 dl/g, and 1 to 300 parts by weight of an ultra-high-molecular weight polyolefin powder (C) having a particle diameter of 1 to 100 μm and an intrinsic viscosity (η), as measured in a decalin solvent at 135° C., of 10 to 40 dl/g, and
said thermoplastic olefin elastomer (A); and
wherein the ultra-high-molecular weight polyolefin powder (C) is homogeneously dispersed in the sliding member layer.

2. The laminate as claimed in claim 1, wherein a polyolefin resin (D) is contained in the resin composition in an amount of 1 to 150 parts by weight based on 100 parts by weight of the thermoplastic olefin elastomer (A).

3. The laminate as claimed in claim 1, wherein an organopolysiloxane (E) is contained in the resin composition in an amount of 1 to 50 parts by weight based on 100 parts by weight of the thermoplastic olefin elastomer (A).

4. The laminate as claimed in claim 1, wherein a fatty acid amide (F) is contained in the resin composition in an amount of 1 to 50 parts by weight based on 100 parts by weight of the thermoplastic olefin elastomer (A).

5. The laminate as claimed in claim 1, wherein a fluororubber (G) is contained in the resin composition in an amount of 1 to 20 parts by weight based on 100 parts by weight of the thermoplastic olefin elastomer (A).

6. The laminate as claimed in claim 1, wherein the thermoplastic olefin elastomer (A) comprises a crystalline polyolefin and a rubber.

7. The laminate as claimed in claim 6, wherein the crystalline polyolefin is at least one selected from the group consisting of:
(a) an ethylene homopolymer,
(b) a copolymer of ethylene and not more than 10% by mol of another α-olefin or a vinyl monomer,
(c) a propylene homopolymer,
(d) a random copolymer of propylene and not more than 10% by mol of another α-olefin,
(e) a block copolymer of propylene and not more than 30% by mol of another α-olefin,
(f) a 1-butene homopolymer,
(g) a random copolymer of 1-butene and not more than 10% by mol of another α-olefin,
(h) a 4-methyl-1-pentene homopolymer, and
(i) a random copolymer of 4-methyl-1-pentene and not more than 20% by mol of another α-olefin.

8. The laminate as claimed in claim 6, wherein the rubber is at least one selected from the group consisting of:
(a) an ethylene/α-olefin copolymer rubber wherein the ethylene/α-olefin molar ratio is about 90/10 to 50/50,
(b) an ethylene/α-olefin/non-conjugated diene copolymer rubber wherein the ethylene/α-olefin molar ratio is about 90/10 to 50/50,
(c) a propylene/α-olefin copolymer rubber wherein the propylene/α-olefin molar ratio is about 90/10 to 50/50, and
(d) a butene/α-olefin copolymer rubber wherein the butene/α-olefin molar ratio is about 90/10 to 50/50.

9. The laminate as claimed in claim 6, wherein the rubber is at least one selected from the group consisting of styrene-butadiene rubber (SBR), nitrile rubber (NBR), natural rubber (NR) and butyl rubber (IIR), SEBS and polyisobutylene.

10. The laminate as claimed in claim 6, wherein the thermoplastic elastomer (A) is partially crosslinked.

11. The laminate as claimed in claim 1, wherein the ultra-high-molecular weight polyolefin (B) comprises a homopolymer of at least one α-olefin, wherein said αolefin is selected from the group consisting of ethylene, propylene, 1-butene, 1-pentene, 1-hexene, 1-octene, 1-decene, 1-dodecene, 4-methyl-1-pentene and 3-methyl-1-pentene.

* * * * *